Aug. 22, 1950 H. A. WHEELER 2,519,524

MULTIPLE-TUNED WAVE-SELECTOR SYSTEM

Filed Aug. 13, 1947 2 Sheets-Sheet 1

INVENTOR.
HAROLD A. WHEELER

BY John A. Harvey

ATTORNEY

Aug. 22, 1950 H. A. WHEELER 2,519,524

MULTIPLE-TUNED WAVE-SELECTOR SYSTEM

Filed Aug. 13, 1947 2 Sheets-Sheet 2

INVENTOR.
HAROLD A. WHEELER

BY John A. Harvey

ATTORNEY

Patented Aug. 22, 1950 2,519,524

UNITED STATES PATENT OFFICE 2,519,524

MULTIPLE-TUNED WAVE-SELECTOR SYSTEM

Harold A. Wheeler, Great Neck, N. Y., assignor to Hazeltine Research, Inc., Chicago, Ill., a corporation of Illinois Application August 13, 1947, Serial No. 768,381

13 Claims. (Cl. 178—44)

Figure 1:
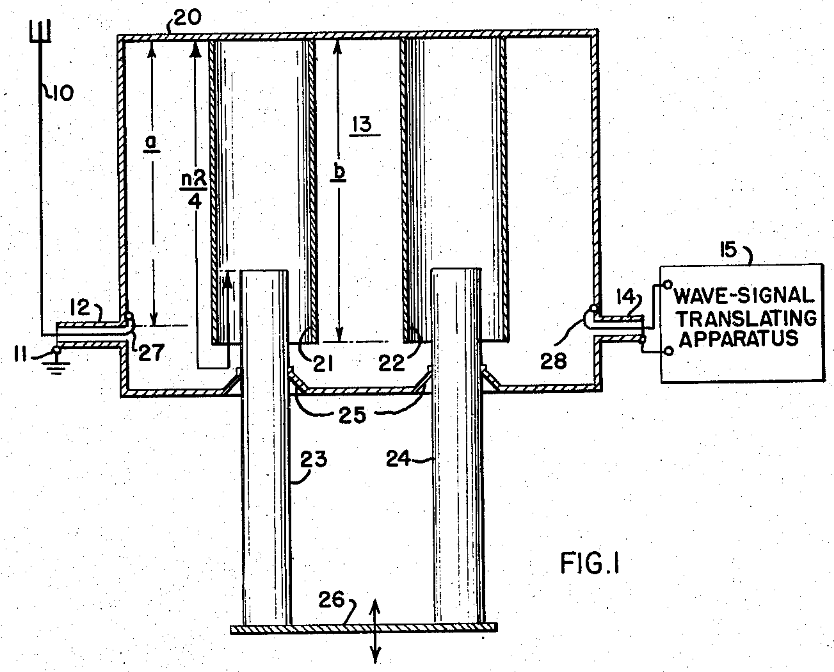

The present invention relates to wave-signal selector systems and particularly to such systems of the type which utilize resonant transmission-line sections tunable over a range of operating wave lengths. More specifically, the invention is directed to multiple-tuned selector systems utilizing a plurality of tunable transmission-line sections and featuring approximately constant frequency band width when tuned to any selected wave length within a desired operating range.

Wave-signal selector systems are widely used in signal-translating apparatus to effect the translation of desired wave signals to the exclusion of undesired ones. For example, in wave-signal receivers of the superheterodyne type one or more tunable selector systems are employed in the high-frequency amplifier stages by which to select a desired received wave signal, and one or more fixed-tuned selector systems are utilized in the intermediate-frequency amplifier stages for accomplishing a further selection or discrimination in favor of the desired wave signal.

In general, selector systems translate with favorable amplitude all wave signals having wave lengths or frequencies within a predetermined continuous band having defined upper and lower cutoff values. Wave signals of frequencies outside of the compass of that defined band are either not translated by the selector or are translated with a comparatively insignificant amplitude. The group of frequencies translated is called the "pass band" which may be either narrow or wide as desired for a specific application. Where the selector is of the fixed-tuned type, the desired pass-band characteristic may be readily achieved by well-known principles of design and adjustment of the system components. Tunable selector systems, on the other hand, frequently require more complicated circuit arrangements or rely upon particular laws of variation of their circuit components, and this is particularly true where the frequency band width is to remain approximately constant with tuning of the system over its intended operating range.

The problems encountered in the design and adjustment of a tunable selector system of constant frequency band width have heretofore been generally capable of solution where the contemplated operating range is such as to permit the use of lumped inductors and capacitors which may be designed and constructed to have some particular law of variation with tuning such as to maintain approximately constant band width. However, selector systems for short-wave-length applications in many instances do not utilize lumped circuit components but rather rely for their resonance phenomena upon distributed inductances and capacitances of wave guides, such as resonant transmission-line sections.

In a copending application of B. F. Tyson, Serial No. 599,372, filed June 14, 1945, entitled "Wave-Signal Selector System," now Patent No. 2,513,761, issued July 24, 1950, and assigned to the same assignee as the present application, there is disclosed and claimed a multiple-tuned selector system suitable for short-wave-length or high-frequency installations. One such arrangement includes a pair of quarter-wave transmission-line sections simultaneously tunable over a range of operating wave lengths. The coupling connections for applying wave signals to, or deriving such signals from, the line sections are arranged and positioned along the latter in such a manner that each section has an approximately constant band width over the intended range of operation. In that case, the line sections are essentially independent of one another, both mechanically and electrically, but include a specific coupling therebetween so that signals translated by one may be transferred to and passed on by the other assuming, of course, that the sections exhibit related band-width characteristics. The present invention is similar to that of the copending application referred to but proposes a selector system which has a simplified construction and yet exhibits substantially constant frequency band width over a desired tuning range of wave lengths.

It is an object of the present invention, therefore, to provide a new and improved multiple-tuned wave-signal selector system which has substantially constant frequency band width for any operating wave length within a desired tuning range.

It is another object of the invention to provide a new and improved multiple-tuned wave-signal selector system having a simplified construction and possessing an approximately constant frequency band width for any operating wave length within a desired tuning range.

It is a specific object of the invention to provide a multiple-tuned wave-signal selector system having tandem-connected resonant transmission-line sections with a simplified coupling therebetween, selected to establish substantially constant frequency band width over a tuning range of operating wave lengths.

In accordance with the invention, a multiple-tuned wave-signal selector system tunable over a range of wave lengths comprises a system of conductive surfaces including a plurality of substantially parallel elongated conductors. These conductors provide a corresponding plurality of transmission-line sections which are separated from one another in a predetermined order of alignment by a distance less than one radian length at the mean wave length of the range and are exposed to one another over portions thereof having an effective electrical length which is substantially different from an integral multiple of one-quarter of any wave length within that range. The selector system also includes tuning devices, spaced from the aforesaid exposed portions, for adjusting the effective electrical lengths of the line sections to values equal to an integral multiple of one-quarter of any desired operating wave length within the range. The exposed portions of the line sections have an effective electrical length proportioned relative to the mean operating wave length to provide a frequency band width for the selector system which is substantially constant as the line sections are tuned over the range.

For a better understanding of the present invention, together with other and further objects thereof, reference is had to the following description taken in connection with the accompanying drawings, and its scope will be pointed out in the appended claims.

Figure 2A:
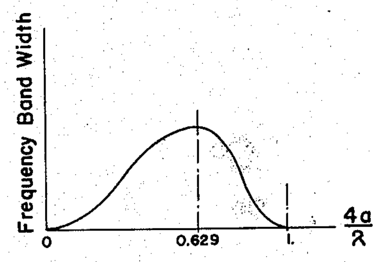
Figure 5A:
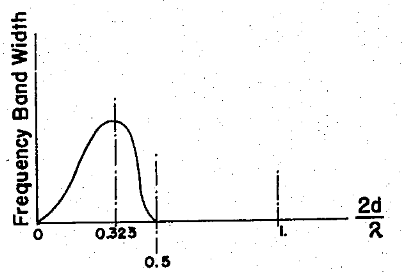
Figure 2B:
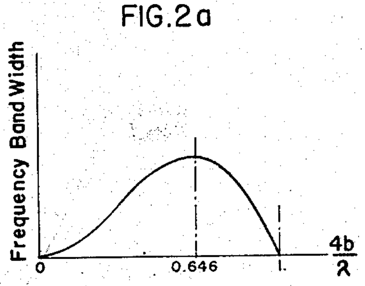
Figure 5B:
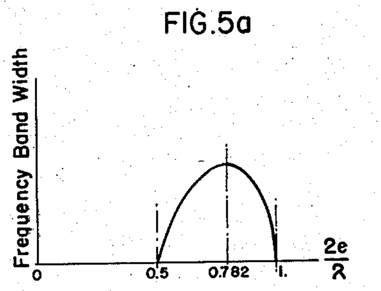
Figure 3:
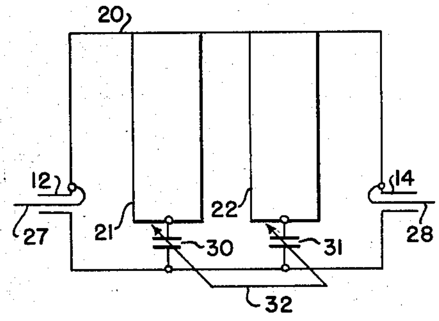
Figure 4:
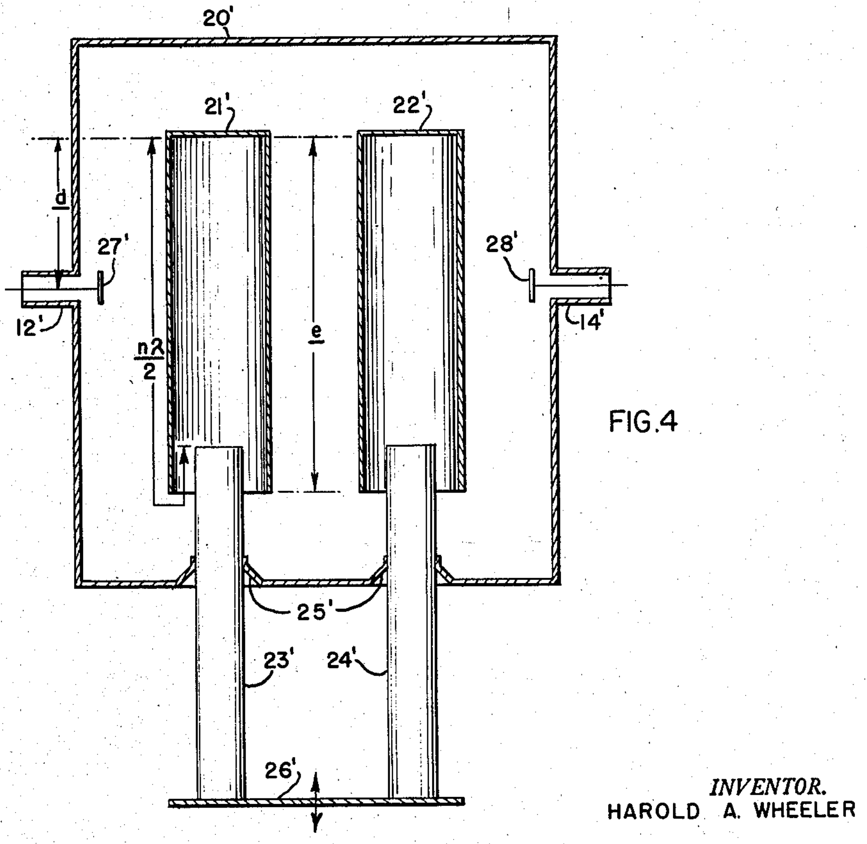

In the drawings, Fig. 1 is a schematic representation of a complete wave-signal translating system which utilizes a multiple-tuned selector system embodying the invention in a particular form; Figs. 2*a* and 2*b* comprise curves representing the variation in band width with tuning of the selector system; Fig. 3 shows schematically a modified form of the selector system of Fig. 1; Fig. 4 is a schematic representation of another form of selector system in accordance with the invention; and Figs. 5*a* and 5*b* are curves demonstrating the variation of band width in a selector system of the type represented in Fig. 4 with tuning thereof.

Referring now more particularly to Fig. 1, the arrangement there represented comprises a complete wave-signal translating system including a multiple-tuned selector system embodying the present invention in one particular form. The wave-signal translating system includes an antenna-ground 10, 11 coupled by a conventional coaxial transmission line 12 to a multiple-tuned wave-signal selector system 13, presently to be described in greater detail. Selector system 13 is coupled by a second coaxial transmission line 14 to the input circuit of a wave-signal translating apparatus 15 which may, for example, be a receiver or transmitter.

The various units just described may, with the exception of the multiple-tuned selector 13, be of conventional construction and operation, the details of which are well known in the art rendering a further detailed description thereof unnecessary. In considering the operation of the over-all system, the particular operating characteristics of selector 13 will be neglected momentarily and apparatus 15 will be assumed to be a conventional wave-signal receiver. Wave signals intercepted by antenna system 10, 11 are translated by transmission line 12 to the selector 13 which is tunable to select a desired wave signal and to discriminate against undesired received wave signals. The selected signal is translated by selector 13 and transmission line 14 to receiver 15 where, after suitable amplification, the modulation components are derived and utilized.

Considering unit 13 more particularly, it may be described as a multiple-tuned wave-signal selector system tunable over a desired range of wave lengths and arranged to exhibit a substantially constant frequency band width over its tuning range. This multiple-tuned selector comprises a system of conductive surfaces including a plurality of substantially parallel elongated conductors providing a corresponding plurality of transmission-line sections. More specifically, the system of conductive surfaces referred to comprises a shield housing 20 of conductive material which may conveniently take the form of a rectangular box. Within shield 20 there are positioned a plurality of conductors 21 and 22 arranged to define with the internal surfaces of the shield a corresponding plurality of transmission-line sections. The number of elongated conductors contained within the shield is determined by the number of selector stages to be included within the selector system. For the embodiment under consideration, conductors 21 and 22 provide the usual two-stage or double-tuned selector.

Conductors 21 and 22, as well as the transmission lines which they form in conjunction with the shield 20, are separated from one another in a predetermined order of alignment by a distance less than one radian length at the mean wave length of the desired tuning range. By the term "radian length" as used in the present specification and claims is meant a length equal to the wave length divided by $2\pi$. This spacing of the conductors is such that the time of propagation of electro-magnetic energy moving from one conductor to the other is inappreciable. In other words, the coupling therebetween is mainly caused by the local electric and magnetic fields rather than the radiation fields. These conductors and their transmission-line sections are also exposed to one another over portions which have an effective electrical length substantially different from an integral multiple of one-quarter of any wave length within the tuning range. While the conductors may be variously arranged within shield 20, the simple construction of Fig. 1 indicates these conductors as being aligned along the longitudinal axis of the shield. Since there is no shield element intermediate the conductors, they are exposed to one another over their entire lengths. Conductors 21 and 22 are individually connected at one end to and supported by a common internal wall of the shield so that the transmission-line section defined by each such conductor and the shield is short-circuited at the one end. The conductors have lengths *b* less than the width of the shield so that each line section is open-circuited at its opposite end. For convenience in tuning it is desirable that conductors 21 and 22 be hollow and have one open end, this being achieved most easily through the use of conductive tubing for the elements 21 and 22, as illustrated. It is also convenient to select the thickness of the shield, that is, its dimension in a plane perpendicular to the plane of the drawing, to have a value of approximately twice the external diameter of the conductors 21 and 22. The thickness dimension of the shield container and the separation of conductors 21 and 22 are chosen to have an appreciable component of coupling between the exposed surfaces of the conductors.

The selector 13 further includes tuning devices, spaced from the exposed portions of the transmission-line sections, for adjusting the effective electrical lengths of such sections to values equal to an odd-integral multiple of one-quarter of any desired operating wave length within the contemplated tuning range. The expression "spaced from the exposed portions of the line sections" is intended to mean that the tuning devices are so located that in tuning over the range they do not mask the exposed portions of the line sections. The tuning devices represented in the Fig. 1 arrangement comprise a plurality of adjustably supported re-entrant conductors 23 and 24 in coaxial alignment with the open ends of hollow conductors 21 and 22, respectively. The re-entrant conductors project through suitable apertures in one wall of the shield 20 and are conductively connected therewith through resilient contact fingers 25, which may be stamped out of the wall in providing the apertures for accommodating the re-entrant conductors. The re-entrant conductors effectively constitute extensions of the shield which, projecting within hollow conductors 21 and 22, establish an effective electrical length for each line section as indicated by the dimension line $$\frac{n\lambda}{4}$$

Preferably, the external diameter of each re-entrant conductor 23, 24 is selected relative to the internal diameter of its associated hollow conductor so that the transmission-line section has substantially uniform characteristic impedance over its entire effective length. The end portions of the re-entrant conductors which extend externally of the shield are joined by a link 26 which comprises means for effecting simultaneous and identical axial displacements of the re-entrant conductors to adjust the effective electrical lengths of both transmission-line sections.

The selector 13 additionally includes coupling devices projecting into the shield 20 for transferring wave-signal energy to and from the selector. One coupling device, shown as an inductive loop 27, couples transmission line 12 with the selector and a second coupling device 28 of the same general construction couples transmission line 14 with the selector.

In considering the operating characteristics of selector 13, it will be understood that conductor 21, being connected at one end to one internal wall of shield 20 and being otherwise spaced from the walls thereof, defines in conjunction with the shield a transmission-line section of the coaxial type in which element 21 serves as an inner conductor while shield 20 constitutes an outer conductor. The re-entrant conductor 23, projecting within the open end of conductor 21, effectively adds an additional length to that line section. Where the over-all line section has a total effective electrical length equal to an odd integral multiple of one-quarter of the operating wave length, it is said to be a resonant line section and exhibits impedance characteristics analogous to those of a parallel-resonant circuit. The magnetic coupling loop 27 couples antenna 10, 11 through transmission line 12 to this resonant section. In like manner, the hollow conductor 22, in association with shield 20 and its re-entrant conductor 24, simulates a second parallel-resonant circuit coupled through loop 28 and transmission line 14 to the receiver 15. The lengths *b* of the resonant lines over which they are exposed to one another introduce a component of coupling between the simulated resonant circuits so long as the effective electrical length of the exposed surfaces of conductors 21 and 22 is substantially different from any integral multiple of one-quarter of the operating wave length. This component of coupling completes the translating circuit through the selector and operatively connects antenna 10, 11 with receiver 15.

Several factors influence the frequency band width of selector 13 and its variation with tuning over the contemplated range of operating wave lengths. These factors include the shunt damping resistance which may be coupled to the resonant line sections, the spacing *a* from the short-circuited end of the line sections to the median plane of the magnetic coupling loops 27 and 28, and the effective electrical length of the exposed conductors 21 and 22.

The frequency band width of a resonant circuit or line section is conventionally expressed with reference to the frequency difference of those operating frequencies on either side of resonance where the voltage response of the circuit or line section is six decibels (db.) below the response at resonance. Preferably, frequency band widths of the two end stages of a multiple-tuned selector embodying the present invention are made equal by their individual values of coupling with the input and output circuits. In Fig. 1, where there are only two stages, this may be satisfied by suitably selecting the sizes of the coupling loops 27 and 28 with relation to the values of damping resistance afforded for each of the two resonant line sections by the transmission lines 12 and 14. Usually such coaxial transmission lines are terminated substantially in their image impedance to have a predominantly resistive terminal impedance of value equal to their characteristic impedance, and coupling these lines to the selector utilizes that impedance as the damping resistance. To equalize frequency band widths of the two stages, advantage may be taken of the fact that the amount of coupling to each stage determines its frequency band width and may be controlled as earlier mentioned by the area of the associated coupling loop 27 or 28.

In the copending Tyson application above referred to, there is a discussion of the optimum spacing *a* of the coupling device for which a resonant transmission-line section, utilized as a selector, has uniform band width over its tuning range. Briefly, it may be shown that for any value of spacing *a* the variation in frequency band width *x* with tuning is given by the following expression:

$$\frac{4a}{\lambda}=\frac{2x}{\pi} \qquad (1)$$

where $x$ is the first root of $$x \tan x=3/2 \qquad (2)$$

and $\lambda$ is the wave length of resonance.

The curve of Fig. 2*a* represents the variation in frequency band width *x* with variations in the factor $$\frac{4a}{\lambda}$$

introduced by wave-length tuning, assuming fixed values for the dimensions *a* and *b* (Fig. 1) and an effective electrical length of the resonant section equal to one-quarter of the operating wave length. It can be shown that maximum band width results from the following condition:

$$\frac{4a}{\lambda}=0.629 \qquad (3)$$

or $$a\approx 0.157\lambda \qquad (4)$$

As already indicated, the length of the exposed portions of the resonant line sections also has a bearing on the frequency band width and may be proportioned relative to the mean wave length to provide a frequency band width which is substantially constant as the line sections of the selector are tuned over their wave-length range. Since the exposed portions of the line sections are represented entirely by the conductors 21 and 22, this factor may be understood by observing the effect of the dimension $b$ on the frequency band width. It may be demonstrated that this effect is defined by the following expression:

$$\frac{4b}{\lambda}=\frac{x}{\pi} \qquad (5)$$

where $x$ is the first root of the expression:

$$\tan x=-x \qquad (6)$$

The curve of Fig. 2*b*, which is predicated upon the assumptions recited in connection with Fig. 2*a*, represents the variation of frequency band width with variations in the factor $$\frac{4b}{\lambda}$$

resulting from wave-length tuning. Maximum band width, so far as this factor is concerned, is realized when the following condition is satisfied:

$$\frac{4b}{\lambda}=0.646 \qquad (7)$$

or $$b\approx 0.162\lambda \qquad (8)$$

Accordingly, the described selector provides a frequency band width which is substantially constant as the several line sections are simultaneously tuned over the operating wave-length range when the resistance damping afforded by coupling lines 12 and 14 is selected, as indicated, and the dimensions $a$ and $b$ have the values expressed in relations (4) and (8). "Uniform frequency band width" as herein used means that the shape of the over-all resonant characteristic of the selector system is maintained approximately the same over the desired range of tuning wave lengths which may, for example, be ±5 per cent. or ±10 per cent. of the mean wave length, as is apparent from the shape of the curves of Figs. 2*a*, 2*b*, 5*a*, and 5*b*.

The actual over-all resonance curve of the selector system may be of the well-known double-peak type or may be flat. When the input and output damping resistances are absent, the characteristic has this double peak in which the separation between peaks is equal to $k$ times $f$, where $k$ is the effective coefficient of coupling between the resonant line sections and $f$ is the frequency corresponding to the mean operating wave length of the individual resonant sections. To obtain the flat curve, which usually is the preferred characteristic, the undamped peaked separation is made equal to the six db. frequency band width of both resonant sections of the selector.

The modified form of selector represented in Fig. 3 is essentially the same in construction as Fig. 1, including a pair of resonant line sections short-circuited at one end. For convenience, corresponding components of the Fig. 1 and Fig. 3 selectors are identified by similar reference characters. In Fig. 3, the tuning is accomplished by a tuning reactor or condenser 30 connected across the open-circuited end of the resonant line including conductor 21 and a condenser 31 similarly connected to the open-circuited end of the other resonant line section. These condensers are unicontrolled, as indicated by the construction line 32, so that the effective electrical lengths of the line sections are simultaneously adjusted.

The selector of the present invention is not limited to the use of short-circuited resonant line sections but may, if desired, employ resonant line sections which are open-circuited at both ends. The modification of Fig. 4 features line sections of that type. Inasmuch as the Fig. 1 and Fig. 4 arrangements are similar in many respects, components of Fig. 4 which have counterparts in the arrangement of Fig. 1 are designated by the same reference characters primed. In this case, however, the conductors 21' and 22' are suitably supported and spaced from all of the walls of the shield 20' to constitute line sections which are open-circuited at both ends. The coupling devices for connecting transmission lines 12' and 14' to the selector are of the capacitive type, being represented by coupling electrodes 27' and 28'.

A line section which is open-circuited at both ends, as in Fig. 4, exhibits impedance characteristics analogous to those of a parallel-resonant circuit when the effective electrical length of the line section is equal to an even integral multiple of one-quarter of the operating wave length. For this reason, the electrical lengths of the reentrant resonant line sections of Fig. 4 are shown by the dimension line $$\frac{n\lambda}{2}$$

The variation in freqency band width $x$ with the spacing $d$ to the coupling electrodes for this modification is given by the expression:

$$\frac{2d}{\lambda}=\frac{x}{\pi} \qquad (9)$$

where $x$ is the first root of $$x \tan x=3/2 \qquad (10)$$

The curve of Fig. 5*a* shows the variation in frequency band width with variations in the factor $$\frac{2d}{\lambda}$$

in response to wave-length tuning for fixed values of dimensions and assuming an electrical length for each resonant line which is equal to one-half of the operating wave length. Maximum band width is achieved when $$\frac{2d}{\lambda}=0.323 \qquad (11)$$

or $$d\approx 0.162\lambda \qquad (12)$$

As for the effect of the length $e$ of the exposed portions of the line sections, the frequency band width varies in accordance with the relation:

$$\frac{2e}{\lambda}=\frac{x}{2\pi} \qquad (13)$$

where $x$ is the second root of $$\tan x=-x \qquad (14)$$

The change in frequency band width with the factor $$\frac{2e}{\lambda}$$

during wave-length tuning is shown by the curve of Fig. 5*b*, assuming the same conditions as recited with reference to Fig. 5*a*. Maximum band width is obtained with $$\frac{2e}{\lambda}=0.782 \quad (15)$$

or $$e \approx 0.391\lambda \quad (16)$$

A comparison of the curves of Figs. 2*b* and 5*b* clearly demonstrates a significant difference in the operating characteristics in the embodiments of Figs. 1 and 4.

The multiple-tuned selector systems illustrated and described are of very simple construction and have the advantage of uniform frequency band width with tuning over a reasonably wide range of operating wave lengths. They utilize a minimum number of circuit components and achieve the desired uniformity of frequency band-width characteristic principally by appropriate proportioning of the effective electrical lengths of the exposed surfaces of the included resonant line sections.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A multiple-tuned wave-selector system tunable over a range of wave lengths comprising: a system of conductive surfaces including a plurality of substantially parallel elongated conductors providing a corresponding plurality of transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; and tuning devices, spaced from said exposed portions, for adjusting the effective electrical lengths of said line sections to values equal to an integral multiple of one-quarter of any desired operating wave length within said range; said exposed portions of said line sections having an effective electrical length proportioned relative to said mean wave length to provide a frequency band width for said selector system which is substantially constant as said line sections are tuned over said range.

2. A multiple-tuned wave-selector system tunable over a range of wave lengths comprising: a system of conductive surfaces including a plurality of substantially parallel elongated conductors providing a corresponding plurality of short-circuited transmission-line sections separated from one another in a predetermined order of alignment by a distance less than one radian length at the mean wave length of said range and exposed to one another over portions thereof having an effective electrical length substantially less than one-quarter of any wave length within said range; and tuning devices, spaced from said exposed portions, for adjusting the effective electrical lengths of said line sections to values equal to an odd integral multiple of one-quarter of any desired operating wave length within said range; said exposed portions of said line sections having an effective electrical length proportioned relative to said mean wave length to provide a band width for said selector system which is substantially constant as said line sections are tuned over said range.

3. A multiple-tuned wave-selector system tunable over a range of wave lengths comprising: a system of conductive surfaces including a plurality of substantially parallel elongated conductors providing a corresponding plurality of open-circuited transmission-line sections separated from one another in a predetermined order of alignment by a distance less than one radian length at the mean wave length of said range and exposed to one another over portions thereof having an effective electrical length substantially less than one-half of any wave length within said range; and tuning devices, spaced from said exposed portions, for adjusting the effective electrical lengths of said line sections to values equal to an even integral multiple of one-quarter of any desired operating wave length within said range; said exposed portions of said line sections having an effective electrical length proportioned relative to said mean wave length to provide a band width for said selector system which is substantially constant as said line sections are tuned over said range.

4. A multiple-tuned wave-selector system tunable over a range of wave lengths comprising: a system of conductive surfaces including a plurality of substantially parallel elongated conductors exposed to one another over their entire lengths and providing a corresponding plurality of transmission-line sections separated from one another in a predetermined order of alignment by a distance less than one radian length at the mean wave length of said range; and tuning devices, spaced from the exposed surfaces of said conductors, for adjusting the effective electrical lengths of said line sections to values equal to an integral multiple of one-quarter of any desired operating wave length within said range; said conductors individually having an effective electrical length which is substantially different from an integral multiple of one-quarter of any wave length within said range and which is proportioned relative to said mean wave length to provide a band width for said selector system which is substantially constant as said line sections are tuned over said range.

5. A multiple-tuned wave-selector system tunable over a range of wave lengths comprising: a system of conductive surfaces including a plurality of substantially parallel elongated hollow conductors providing a corresponding plurality of transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; a plurality of adjustably supported reentrant conductors, individually supported in coaxial alignment with one of said hollow conductors, for varying the effective electrical lengths of said line sections; and means for effecting simultaneous axial displacement of said re-entrant conductors to adjust the effective electrical lengths of said line sections to values equal to an integral multiple of one-quarter of any desired operating wave length within said range; said exposed portions of said line sections having an effective electrical length proportioned relative to said mean wave length to provide a band width for said selector system which is substantially constant as said line sections are tuned over said range.

6. A multiple-tuned wave-selector system tunable over a range of wave lengths comprising: a housing of conductive material; a plurality of substantially parallel elongated conductors positioned within said housing and constituting therewith a corresponding plurality of transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; and tuning devices, spaced from said exposed portions, for adjusting the effective electrical lengths of said line sections to values equal to an integral multiple of one-quarter of any desired operating wave length within said range; said exposed portions of said line sections having an effective electrical length proportioned relative to said mean wave length to provide a band width for said selector system which is substantially constant as said line sections are tuned over said range.

7. A multiple-tuned wave-selector system tunable over a range of wave lengths comprising: a housing of conductive material; a plurality of substantially parallel elongated conductors positioned within and connected at one end to said housing to constitute therewith a corresponding plurality of short-circuited transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; and tuning devices, spaced from said exposed portions, for adjusting the effective electrical lengths of said line sections to values equal to an odd integral multiple of one-quarter of any desired operating wave length within said range; said exposed portions of said line sections having an effective electrical length proportioned relative to said mean wave length to provide a band width for said selector system which is substantially constant as said line sections are tuned over said range.

8. A multiple-tuned wave-selector system tunable over a range of wave lengths comprising: a housing of conductive material; a plurality of substantially parallel elongated conductors positioned within and connected at one end to said housing to constitute therewith a corresponding plurality of short-circuited transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; and tuning devices, spaced from said exposed portions, for adjusting the effective electrical lengths of said line sections to values equal to one-quarter of any desired operating wave length within said range; said exposed portions of said line sections having an effective electrical length approximately equal to 0.162 times said mean wave length to provide a band width for said selector system which is substantially constant as said line sections are tuned over said range.

9. A multiple-tuned wave-selector system tunable over a range of wave lengths comprising: a housing of conductive material; a plurality of substantially parallel elongated conductors positioned within and connected at one end to said housing to constitute therewith a corresponding plurality of short-circuited transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; tuning devices, spaced from said exposed portions, for adjusting the effective electrical lengths of said line sections to values equal to one-quarter of any desired operating wave length within said range; said exposed portions of said line sections having an effective electrical length approximately equal to 0.162 times said mean wave length to provide a band width for said selector system which is substantially constant as said line sections are tuned over said range; and at least one wave-signal-energy coupling device projecting into said housing and coupled to an individual one of said transmission-line sections at a point spaced approximately 0.157 times said mean wave length from the short-circuited end thereof.

10. A multiple-tuned wave-selector system tunable over a range of wave lengths comprising: a housing of conductive material; a plurality of substantially parallel elongated conductors positioned within said housing and spaced from the walls thereof to constitute therewith a corresponding plurality of open-circuited transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; and tuning devices, spaced from said exposed portions, for adjusting the effective electrical lengths of said line sections to values equal to an even integral multiple of one-quarter of any desired operating wave length within said range; said exposed portions of said line sections having an effective electrical length proportioned relative to said mean wave length to provide a band width for said selector system which is substantially constant as said line sections are tuned over said range.

11. A multiple-tuned wave-selector system tunable over a range of wave lengths comprising: a housing of conductive material; a plurality of substantially parallel elongated conductors positioned within said housing and spaced from the walls thereof to constitute therewith a corresponding plurality of open-circuited transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; and tuning devices, spaced from said exposed portions, for adjusting the effective electrical lengths of said line sections to values equal to one-half of any desired operating wave length within said range; said exposed portions of said line sections having an effective electrical length approximately equal to 0.391 times said mean wave length to provide a band width for said selector system which is substantially constant as said line sections are tuned over said range.

12. A multiple-tuned wave-selector system tunable over a range of wave lengths comprising: a housing of conductive material; a plurality of substantially parallel elongated conductors positioned within said housing and spaced from the walls thereof to constitute therewith a corresponding plurality of open-circuited transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; tuning devices, spaced from said exposed portions, for adjusting the effective electrical lengths of said line sections to values equal to one-half of any desired operating wave length within said range; said exposed portions of said line sections having an effective electrical length approximately equal to 0.391 times said means wave length to provide a band width for said selector which is substantially constant as said line sections are tuned over said range; and at least one wave-signal-energy coupling device projecting into said housing and coupled to an individual one of said transmission-line sections at a point spaced approximately 0.162 times said mean wave length from an open end thereof.

13. A multiple-tuned wave-selector system tunable over a range of wave lengths comprising: a system of conductive surfaces including a plurality of substantially parallel elongated conductors providing a corresponding plurality of transmission-line sections separated from one another in a predetermined order of alignment by a distance less than one radian length at the mean wave length of said range and exposed to one another over portions thereof having an effective electrical length substantially different from an integral multiple of one-quarter of any wave length within said range; and tuning reactors, connected across the end portions of said line sections, for adjusting the effective electrical lengths thereof to values equal to an integral multiple of one-quarter of any desired operating wave length within said range; said exposed portions of said line sections having an effective electrical length proportioned relative to said mean wave length to provide a band width for said selector system which is substantially constant as said line sections are tuned over said range.

HAROLD A. WHEELER.

REFERENCES CITED

The following references are of record in the file of this patent:

UNITED STATES PATENTS

| Number | Name | Date |
| --- | --- | --- |
| 2,402,443 | Peterson | June 18, 1946 |